(12) United States Patent
Shimshie

(10) Patent No.: US 9,309,930 B2
(45) Date of Patent: Apr. 12, 2016

(54) VEHICULAR TORQUE LIMITER AND METHOD FOR LIMITING TORQUE

(71) Applicant: Erad Shimshie, Tel Mond (IL)

(72) Inventor: Erad Shimshie, Tel Mond (IL)

( * ) Notice: Subject to any disclaimer, the term of this patent is extended or adjusted under 35 U.S.C. 154(b) by 0 days.

(21) Appl. No.: 13/785,095

(22) Filed: Mar. 5, 2013

(65) Prior Publication Data

US 2014/0256454 A1    Sep. 11, 2014

(51) Int. Cl.
| | |
|---|---|
| *F16D 7/06* | (2006.01) |
| *F16D 7/08* | (2006.01) |
| *F16D 43/206* | (2006.01) |
| *B60B 27/04* | (2006.01) |

(52) U.S. Cl.
CPC ............... *F16D 7/08* (2013.01); *F16D 43/206* (2013.01); *B60B 27/042* (2013.01)

(58) Field of Classification Search
CPC ...... F16D 7/08; F16D 43/206; B60K 23/0808
USPC .......... 464/35–39; 192/56.62; 180/76; 301/1, 301/111.02
See application file for complete search history.

(56) References Cited

U.S. PATENT DOCUMENTS

| | | | | |
|---|---|---|---|---|
| 2,164,870 A | * | 7/1939 | De Salardi | 464/35 X |
| 2,714,935 A | * | 8/1955 | Papp | 180/76 X |
| 2,855,062 A | * | 10/1958 | Arentzen | 180/76 X |
| 2,977,779 A | | 4/1961 | Steinke | |
| 4,018,298 A | * | 4/1977 | Frazee | 180/76 |
| 4,089,610 A | | 5/1978 | Kleespies | |
| 4,174,621 A | | 11/1979 | Woltjen | |
| 2015/0096862 A1 | * | 4/2015 | Hauptmann | |

FOREIGN PATENT DOCUMENTS

| | | | | |
|---|---|---|---|---|
| KR | 20110004833 | | 1/2011 | |
| SU | 734452 | * | 5/1980 | 464/36 |
| SU | 734452 A1 | * | 5/1980 | 464/36 |

OTHER PUBLICATIONS

Fenstermacher, Carl.,Torque Limiters Tame Overloads, Motor System Design, Feb. 1, 2000, [retrieved on Aug. 12, 2015] Retrieved from the Internet URL<http://machinedesign.com/technologies/toque-limiters-tame-overloads>.*

* cited by examiner

*Primary Examiner* — Gregory Binda
(74) *Attorney, Agent, or Firm* — Daniel J. Swirsky; AlphaPatent Associates Ltd.

(57) ABSTRACT

A vehicular torque limiter having a first shaft including connecting means complementary to connecting means of an end of an axle-shaft of the vehicle, a second shaft connectable to a hub assembly of a wheel of the vehicle by bolts of the wheel which are accessible, torque limiting elements, for limiting torque between the first and second shafts, thereby a drive member of the wheel which directly connects the axle-shaft to the hub assembly, is replaceable with the torque limiter, thereby providing a universal, easy to install torque limiter designed for vehicles.

5 Claims, 7 Drawing Sheets

VEHICULAR TORQUE LIMITER AND METHOD FOR LIMITING TORQUE

FIELD OF THE INVENTION

The present invention relates to the field of vehicular torque limiters. More particularly, the invention relates to a method and apparatus for assembling a vehicular torque limiter.

BACKGROUND OF THE INVENTION

Vehicular torque limiters can protect vehicles during extreme pressure and forces.

Since vehicles are often under extreme pressure and load, failure may occur to the vehicle driving parts.

The prior art approach of handling those forces consists of installing heavy duty parts in the drive train for avoiding amortization of the parts. This approach doesn't really eliminate the problem, since it transfers the failures upon those extreme forces to the less-durable mechanical elements.

"A torque limiter is an automatic device that protects mechanical equipment, or its work, from damage by mechanical overload" (from Wikipedia). The shafts thereof automatically disengage upon presence of the mechanical overload. U.S. Pat. No. 2,977,779 to Steinke discloses a torque limiter for protecting the drive train of a vehicle. However, assembling and disassembling of this torque limiter requires inconvenient, professional and accurate handling.

Thus, as a matter of fact, vehicular torque limiters are not commercially manufactured and assembled to vehicles, since their handling is too expensive for ensuring the protection it provides. Also, replacement of a torque limiter upon amortization thereof is a significant feature, which is not practical to this torque limiter.

As a matter of fact, there are no vehicular torque limiters in the market, and vehicles do not include torque limiters.

All the methods described above have not yet provided satisfactory solutions to the problem of inconvenient, professional and accurate required handling for assembling and disassembling a vehicular torque limiter.

It is an object of the present invention to provide a method and apparatus for simple and inexpensive assembling and disassembling of a vehicular torque limiter.

It is an object of the present invention to provide a solution to the above-mentioned and to other problems of the prior art.

Other objects and advantages of the invention will become apparent as the description proceeds.

SUMMARY OF THE INVENTION

A torque limiter according to the present invention is an easy to install, ready to use, out of the box universal torque limiter for vehicles preventing the damage to drive train parts due to extreme load or forces. It is assumed that that there is not such commercial product designed for vehicles.

The invention discloses shelf product requiring no modification to the existing parts of the vehicle.

The invention suggests a simple method of dealing with these forces for keeping the vehicle driving elements undamaged.

The torque limiter according to the present invention can be easily replaceable with another torque limiter upon amortization, such that the amortization of the vehicle will always be repaired by replacing an immediate and easy to install element.

In the figures and/or description herein, the following reference numerals have been mentioned:

numeral 10 denotes a torque limiter according to one embodiment of the present invention;
numeral 12 denotes an axle-shaft of a vehicle;
numeral 14 denotes an axle housing of the vehicle;
numeral 16 denotes a drive member of the vehicle;
numeral 18 denotes a bolt of the vehicle;
numeral 20 denotes a rim of the vehicle;
numeral 22 denotes a bearing of the vehicle;
numeral 24 denotes indention cogs of the axle-shaft;
numeral 26 denotes cogs of the drive member;
numeral 26A denotes cogs of the torque limiter;
numeral 28 denotes a hub assembly of a wheel of the vehicle;
numeral 30 denotes a lug nut of the vehicle, for holding the rim;
numeral 32 denotes an indentation of a disk of the torque limiter;
numeral 36 denotes a hardened ball or cylinder (roller) or other round object of the torque limiter;
numeral 38 denotes an indentation of a disk of the torque limiter;
numeral 40 denotes a springy element of the torque limiter;
numeral 50 denotes a tire of the vehicle;
numeral 52 denotes a disk of the torque limiter;
numeral 54 denotes an external shaft of the torque limiter;
numeral 56 denotes a disk of the torque limiter;
numeral 58 denotes an internal shaft of the torque limiter;
numeral 60 denotes a cover of the torque limiter; and
numeral 62 denotes bolts.

Numeral 64 denotes the environment. Numeral 68 denotes a standard wheel of the vehicle marketed with the vehicle, including rim 20 and hub assembly 28.

In one aspect, the present invention is directed to a vehicular torque limiter (10) comprising:

a first shaft (58) comprising connecting means (26A) complementary to connecting means (24) of an end of an axle-shaft (12) of the vehicle;

a second shaft (54) connectable to a hub assembly (28) of a wheel of the vehicle by bolts (18) of the wheel which are accessible;

torque limiting elements (40, 38, 36, 32), for limiting torque between the first (58) and second (54) shafts, thereby a drive member (16) of the wheel which directly connects the axle-shaft (12) to the hub assembly (28), is replaceable with the torque limiter (10), thereby providing a universal, easy to install torque limiter (10) designed for vehicles.

Each torque limiter (10) is intended for one wheel of the vehicle, thereby providing independent torque limiting for each axle-shaft (12).

For the case in which the connecting means (24) of the axle-shaft (12) comprise cogs (24), then the connecting means (26A) of the first shaft (58) may comprise cogs (26A) complementary to the axle-shaft cogs (24).

The torque limiting elements may comprise:
a disk (56) within the first shaft (58);
rounded indentations (38) on the disk (56) of the first shaft (58);
a disk (52) within the second shaft (54);
rounded indentations (32) on the disk (52) of the second shaft (54);
round objects (36), each disposed between
  one of the rounded indentations (38) of the disk (56) of the first shaft (58) and
  one of the rounded indentations (32) of the disk (52) of the second shaft (54).

The round objects (36) may comprise hardened cylinders.

The vehicular torque limiter (10) may further comprise:
a springy element (40) for pressing the first shaft (58) towards the second shaft (54); and
a cover (60) for packaging the first shaft (58) between the cover (60) and the second shaft (54).

The torque limiting elements may comprise elements selected from a group including: friction elements, shear pin elements sacrificing a mechanical pin to disconnect said shafts, magnetic elements using magnets mounted to each shaft, electro-magnetic elements using electro-magnets mounted to each shaft.

In another aspect, the present invention is directed to a method for limiting torque of a vehicle, the method comprising the steps of:
providing a torque limiter (10);
removing a drive member (16) of a wheel of the vehicle, by removing connecting means (26A) thereof;
replacing the torque limiter (10) with the drive member, using connecting means (26) of the torque limiter (10) that are identical to the connecting means of the drive member (16),
thereby providing torque limiting separately to the wheel by applying a simple installation.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF THE INVENTION

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
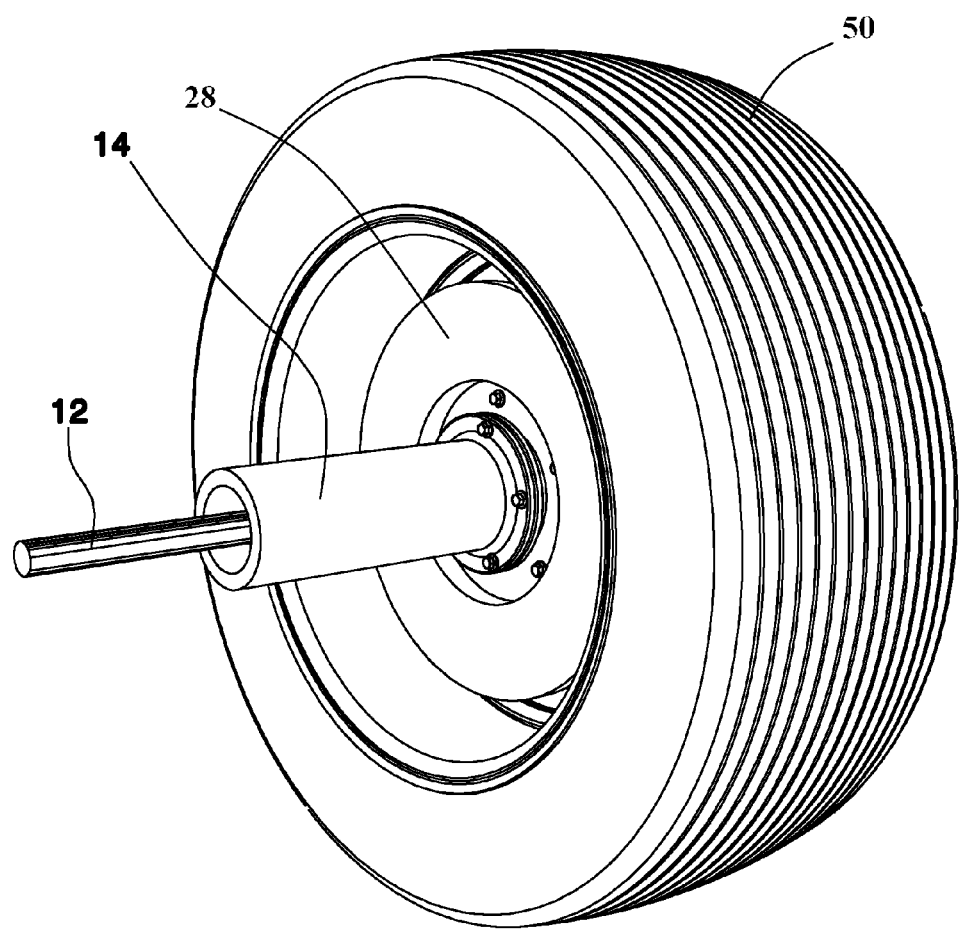
FIG. 1 is a perspective view of a prior art connection of an axle-shaft to a wheel from the rear side of the wheel.

FIG. 1 is a perspective view of a prior art connection of an axle-shaft to a wheel from the rear side of the wheel.

In common vehicles, an axle-shaft 12 within an axle housing 14 (depicted cut) is connected to a hub assembly 28; and a wheel having a tire 50 is connected to hub assembly 28.

Figure 2:
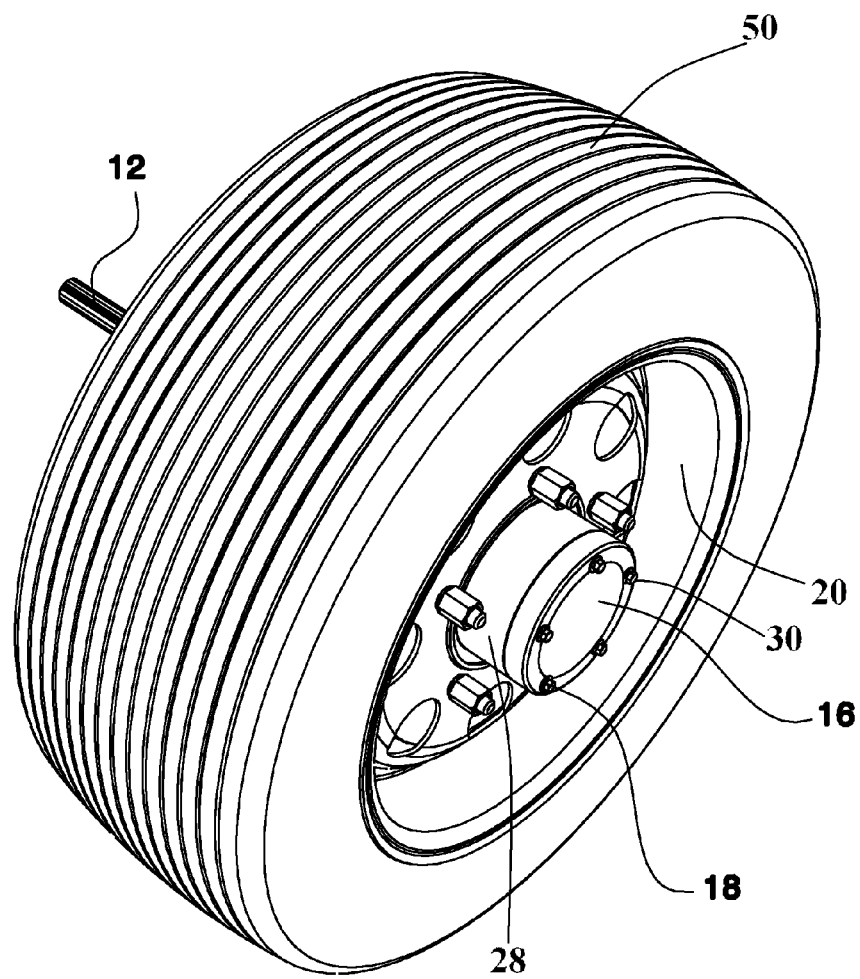
FIG. 2 is a perspective view of the prior art connection of FIG. 1 from the front side of the wheel.

FIG. 2 is a perspective view of the prior art connection of FIG. 1 from the front side of the wheel.

In common vehicles, a rim 20 holding tire 50 is connected to hub assembly 28 by lug nuts 30, which drivers close and open for replacing the wheel.

Certain vehicles especially off-road vehicles include an element enumerated 16, referred herein "drive member" which is relatively an external accessible element of the wheel, which transfers torque.

Axle-shaft 12 transfers torque to drive member 16; and drive member 16 transfers the torque to hub assembly 28 via bolts 18.

Figure 3:
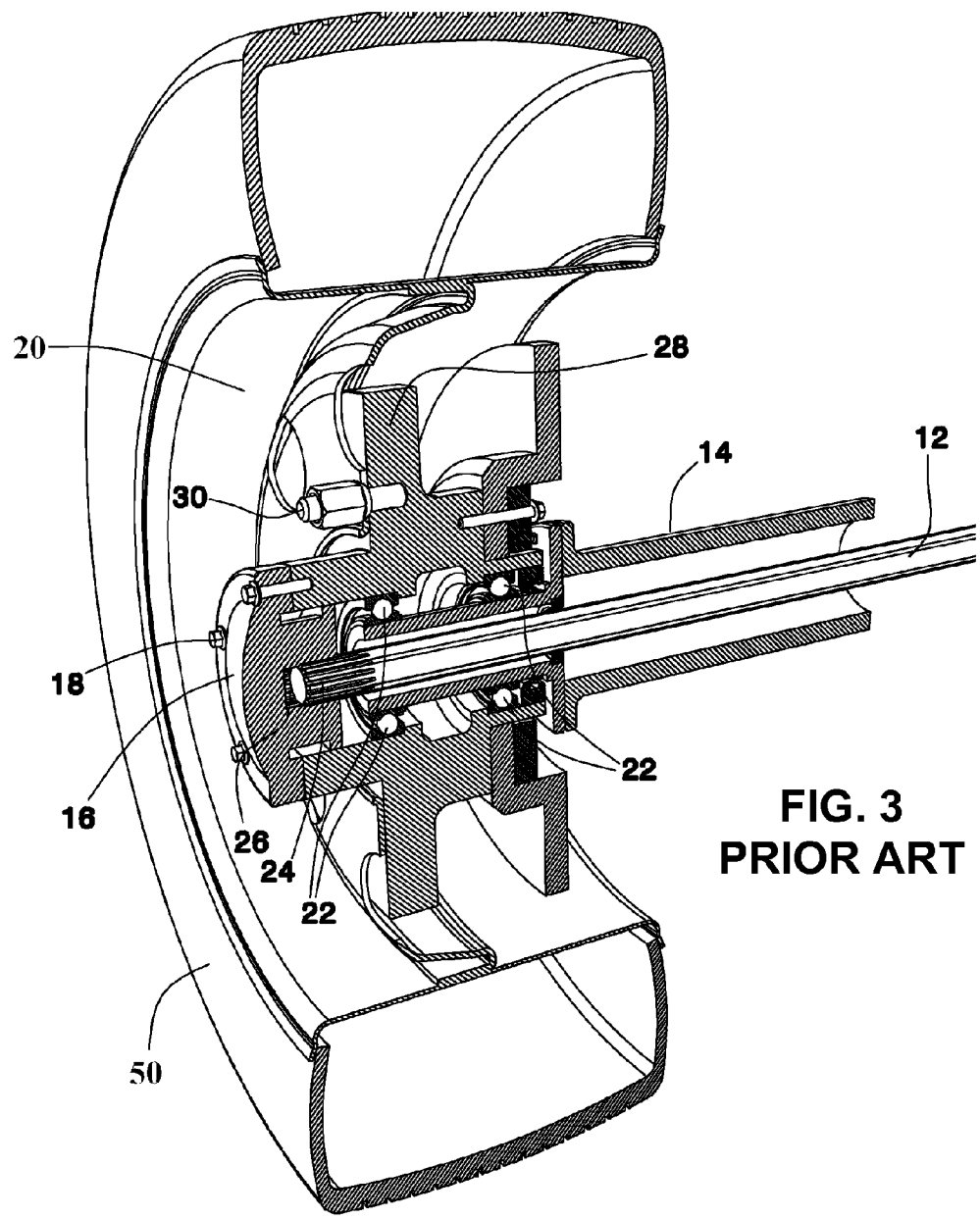
FIG. 3 is a cut sectional view of the prior art connection of FIG. 2.

FIG. 3 is a cut sectional view of the prior art connection of FIG. 2.

Indention cogs 24 of axle-shaft 12 transfer the torque directly to complementary cogs 26 of drive member 16; drive member 16 transfers the torque to hub assembly 28 via bolts 18; and hub assembly 28 transfers the torque to rim 20 via lug nuts 30. Bearings 22 allow the rotational movement of hub assembly 28 in relation to axle housing 14.

Thus, together, axle-shaft 12 transfers the torque directly to hub assembly 28 and to rim 20 and to tire 50.

Figure 4:
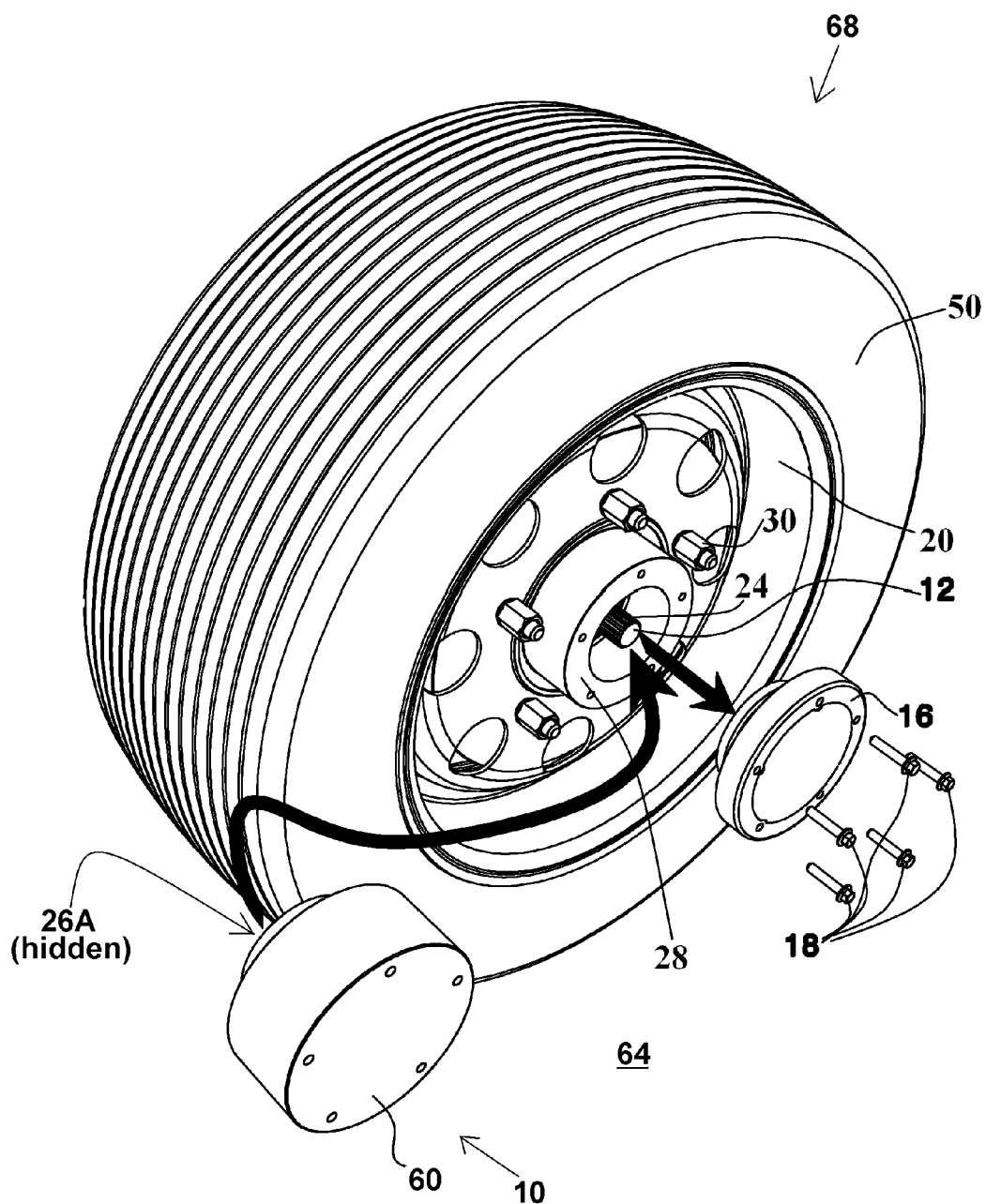
FIG. 4 depicts installation of a torque limiter according to one embodiment of the present invention.

FIG. 4 depicts installation of a torque limiter according to one embodiment of the present invention.

A torque limiter 10 of the present invention is designed to replace drive member 16.

Thus, since drive member 16 transfers torque directly from axle-shaft 12 to hub assembly 28, torque limiter 10, replacing the prior art drive member 16, limits the torque transferred therebetween.

Thus, since member 16 is an external accessible element, and the assembling and disassembling thereof is simple, the assembling and disassembling of torque limiter 10 is simple as well.

At the first step, drive member 16 is disassembled from axle-shaft 12 by removing bolts 18. At the second step, torque limiter 10 is assembled to axle-shaft 12. At the third step, bolts 18 are screwed back.

None of the steps requires lifting the vehicle or making changes to the vehicles elements.

Thus, torque limiter 10 of the present invention constitutes a universal element, being an easy to install shelf product.

According to a preferred embodiment each model of vehicle shall have its adapted torque limiter 10 for immediate installation.

Figure 5:
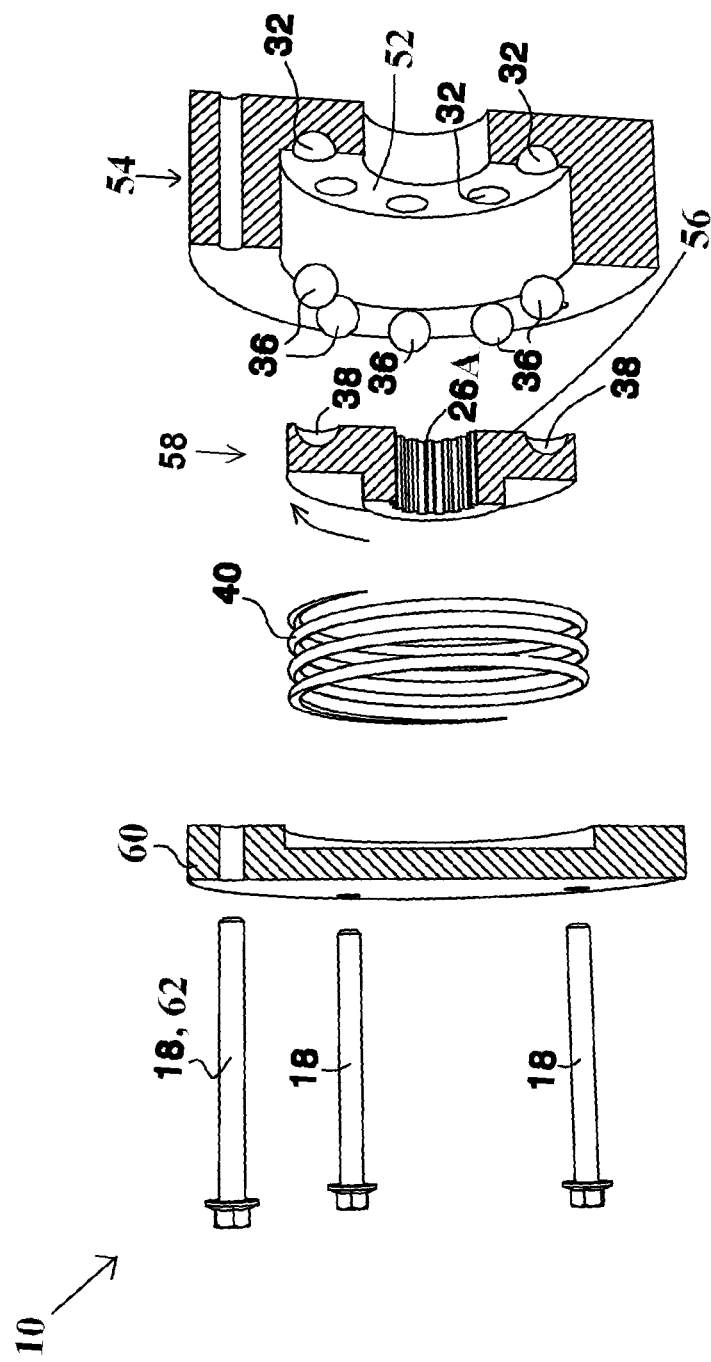
FIG. 5 is an exploded view of the torque limiter of FIG. 4 according to one embodiment of the present invention.

FIG. 5 is an exploded view of the torque limiter of FIG. 4 according to one embodiment of the present invention.

Torque limiter 10 may constitute any known type for disconnecting the shafts thereof. Torque limiter 10 may constitute a friction plate type; or a shear pin type sacrificing a mechanical pin to disconnect the shafts; or a magnetic type using magnets or electromagnets mounted to each shaft, or other types.

FIG. 5 depicts torque limiter 10 constituting a ball detent type. Torque limiter 10 transmits force between an external shaft 54 having a disk 52 and an internal shaft 58 having a disk 56 via hardened balls 36 or cylinders (rollers) resting in indentations 38 of disk 56 and indentations 32 of disk 52. A cover 60 and external shaft 54 package the other elements of torque 10 therein. A springy element 40 disposed between cover 60 and internal shaft 58, presses disk 56 of internal shaft 58 towards disk 52 of external shaft 54, for holding balls 36 or other rounded objects in place therebetween. Upon torque above a certain threshold, internal shaft 58 is drawn against springy element 40 for slipping.

Bolts 18 of the vehicle may connect cover 60 to external shaft 54. According to another embodiment, bolts 62, which are not part of the vehicle, may connect cover 60 to external shaft 54, so as to install torque limiter 10 to the vehicle when already assembled.

Figure 6:
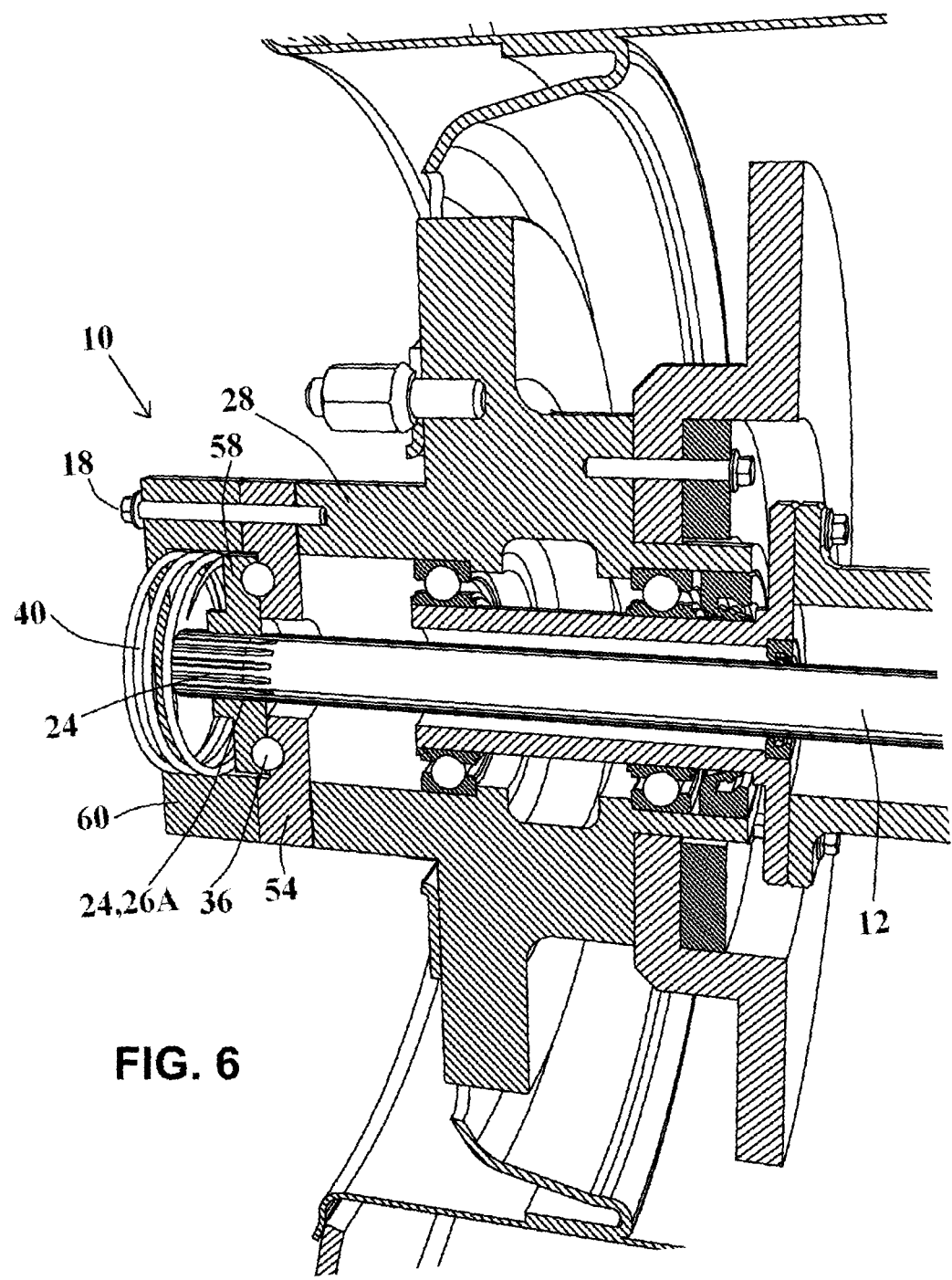
FIG. 6 is a cut sectional view of the connection of FIG. 4 from the internal side of the vehicle.

FIG. 6 is a cut sectional view of the connection of FIG. 4 from the internal side of the vehicle.

Indention cogs 24 of axle-shaft 12 transfer the torque directly to complementary cogs 26A of internal shaft 58 of torque limiter 10. Cogs 26A of torque limiter 10 are identical to cogs 26 of drive member 16.

Internal shaft 58 of torque limiter 10 transfers the torque without exceeding a certain threshold to hardened balls 36 and external shaft 54 of torque limiter 10.

Figure 7:
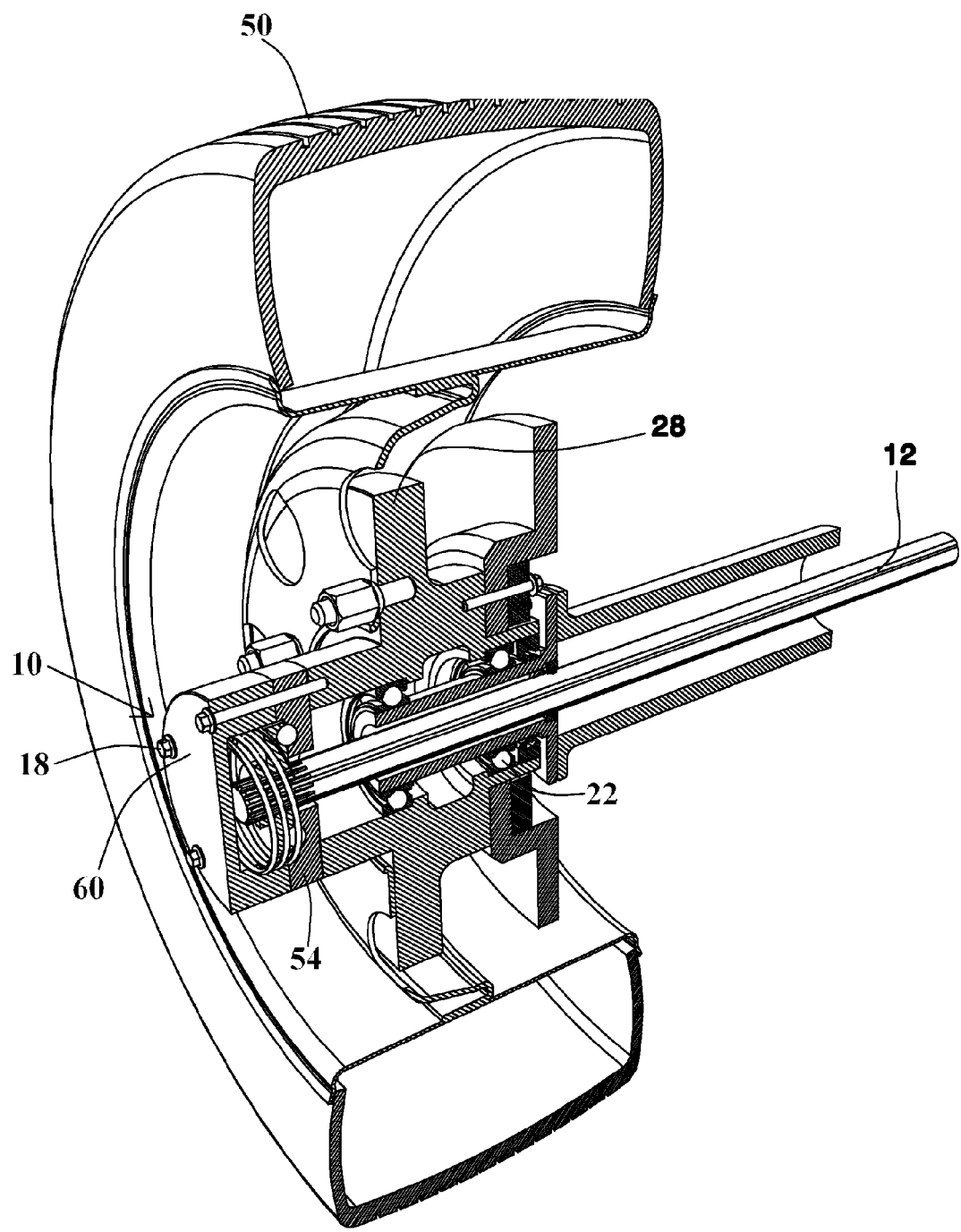
FIG. 7 depicts the cut sectional view of the connection of FIG. 4 from the external side of the vehicle.

FIG. 7 depicts the cut sectional view of the connection of FIG. 4 from the external side of the vehicle.

External shaft 54 and cover 60 of torque limiter 10 are connected to hub assembly 28 via bolts 18. Hub assembly 28 transfers the torque to rim 20 via lug nuts 30. Bearings 22 allow the rotational movement of hub assembly 28 in relation to axle housing 14.

Thus, together, axle-shaft 12 transfers the torque in a limited manner to hub assembly 28 and to tire 50.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A vehicular torque limiter comprising:
   a first shaft disposed facing a vehicle while said torque limiter is installed thereto, and exposed to an environment while said torque limiter is not installed to said vehicle, said first shaft being hollowed from side to side for comprising female connecting means for being complementary to male connecting means of an end of an axle-shaft of said vehicle, said end of the axle-shaft being exposed to the environment once removing a drive member of a standard wheel of the vehicle, thereby said female connecting means of said first shaft allow inserting the end of the axle-shaft thereinto;
   a second shaft comprising an area facing said vehicle while said torque limiter is installed thereto, and exposed to the environment while said torque limiter is not installed to said vehicle, said exposed area being connectable to a hub assembly of said wheel of said vehicle by bolts of said wheel which are accessible;
   torque limiting elements, for limiting torque between said first and second shafts, wherein said torque limiter is an independent product; and
   a cover, for packaging said first shaft and for covering said end of said axle-shaft of said vehicle, thereby said cover does not allow said axle-shaft of said vehicle to cross said cover from side to side,
   thereby said drive member of said wheel which directly connects said axle-shaft to said hub assembly, is replaceable with said torque limiter,
   thereby providing a universal, installable torque limiter designed for vehicles.

2. A vehicular torque limiter according to claim 1, each for one wheel of said vehicle, thereby providing independent torque limiting for each axle-shaft.

3. A vehicular torque limiter according to claim 1, wherein for the case in which said connecting means of said axle-shaft comprise cogs, then
   said connecting means of said first shaft comprises cogs complementary to said axle-shaft cogs.

4. A vehicular torque limiter according to claim 1, wherein said torque limiting elements comprise:
   a disk within said first shaft;
   rounded indentations on said disk of said first shaft;
   a disk within said second shaft;
   rounded indentations on said disk of said second shaft;
   round objects, each disposed between
      one of said rounded indentations of said disk of said first shaft and
      one of said rounded indentations of said disk of said second shaft.

5. A vehicular torque limiter according to claim 1, further comprising:
   a springy element for pressing said first shaft towards said second shaft.

* * * * *